March 13, 1956 J. E. HANSMAN 2,738,133
TEMPERATURE CONTROL FOR HEATING SYSTEMS
Filed March 12, 1953
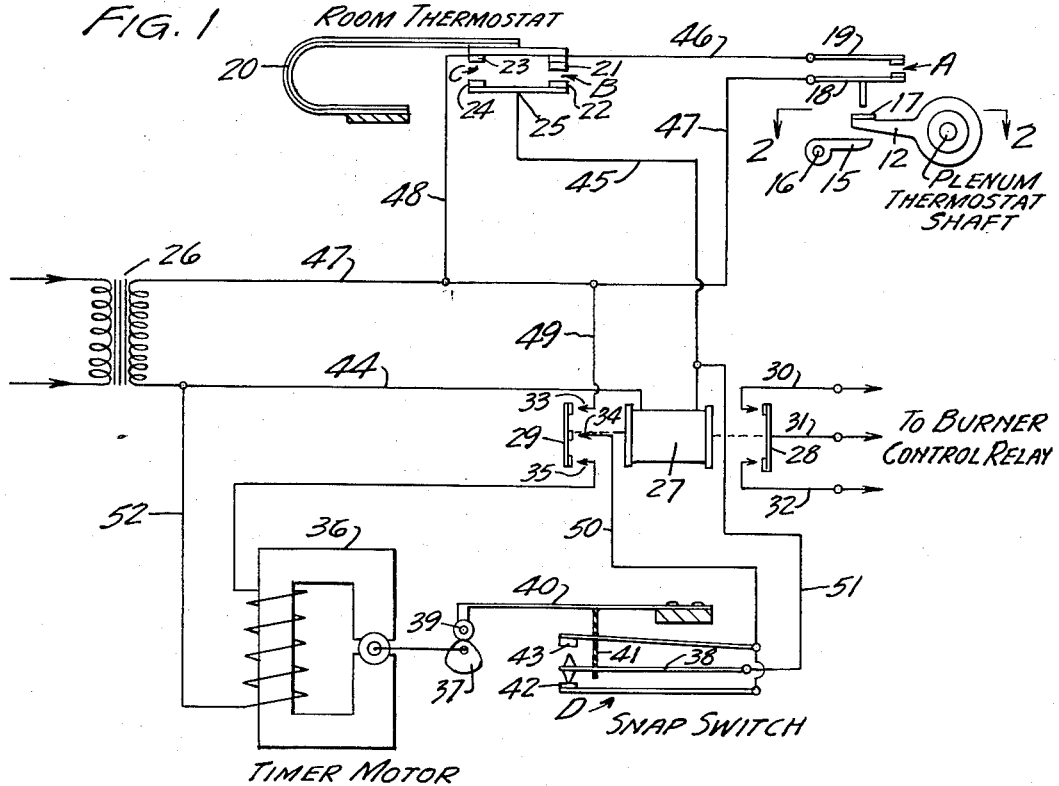
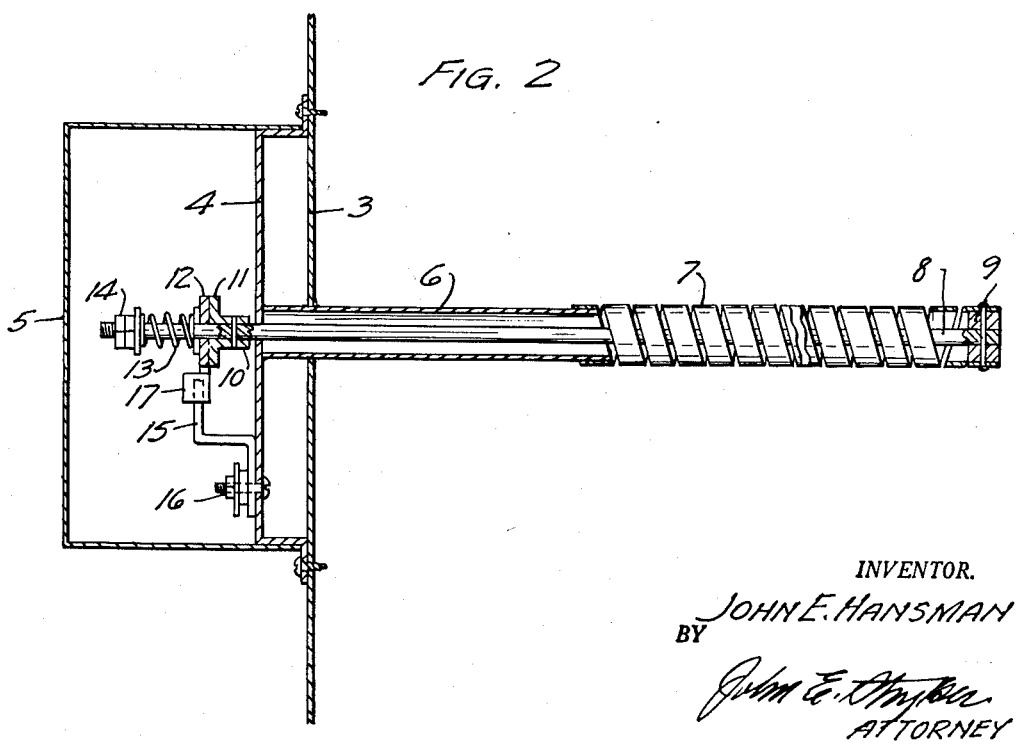
INVENTOR.
JOHN E. HANSMAN
BY
ATTORNEY United States Patent Office 2,738,133
Patented Mar. 13, 1956

2,738,133

TEMPERATURE CONTROL FOR HEATING SYSTEMS

John E. Hansman, White Bear Lake, Minn., assignor to Hansman Industries, Inc., St. Paul, Minn., a corporation of Minnesota Application March 12, 1953, Serial No. 341,892

10 Claims. (Cl. 236—9)

This invention relates to a temperature control for heating systems of the common types wherein heat is supplied by a burner under control of a room thermostat and a fluid medium, e. g., air, water or steam, is heated by the burner and conducted to the rooms to be heated or caused to circulate through radiators in the rooms.

An object of my invention is to provide an inexpensive control for such systems whereby a more even temperature is maintained in the rooms to be heated.

A particular object is to provide a control of the class described comprising a heat responsive element subject to the temperature of the heating medium and operatively connected to means for closing a burner control circuit during periods of declining medium temperatures and to open the control circuit during periods of rising medium temperatures whereby demands for heat are anticipated and the supply of heat is cut off in time to avoid over-riding of the demand or excessive heating.

A further object is to provide in a control of the class described timing means which is operative during periods of low heat demand to cause the burner to operate intermittently for predetermined minimum periods of time and thereby increase the efficiency of the system.

The invention also includes certain other novel features of construction which will be more fully pointed out in the following specification and claims.

Referring to the accompanying drawings which illustrate, by way of example and not for the purpose of limitation, a preferred embodiment of my invention:

Figure 1 is a diagram showing my improved apparatus and suitable circuits, and

Fig. 2 is a part elevational view and part longitudinal section, taken approximately on the line 2—2 of Fig. 1, showing my improved switch actuating mechanism connected to a heat responsive element located in the plenum or other chamber containing the heating medium, this chamber being located in the upper portion of the furnace or other heater containing the burner to be controlled.

In Fig. 2, the numeral 3 indicates a wall of the plenum, bonnet or other chamber containing the heating medium. My improved control apparatus may be mounted on the wall 3 in a suitable casing having a wall 4 which is secured to the wall 3 at its outer side in suitable manner. The casing may be provided with a removable cover 5. Rigidly fastened to the wall 4 and projecting therefrom into the chamber containing the heating medium, through an opening in the wall 3, is a tubular support 6 for a heat responsive element 7. This element may comprise a spirally wound bi-metallic member which is secured at one end to the tube 6. Extending axially through the tube 6 and projecting from both ends thereof is a shaft 8 disposed to support the inner end of the element 7 and to transmit torque to switch operating mechanism in the control casing. The inner end of the element 7 is secured to a collar 9 which is fixed on the shaft 8.

Fixed on the shaft 8 near the outer side of the casing wall 4 is a collar 10 formed with an annular, radially projecting flange 11. A switch actuating arm 12 has a hub portion perforated to receive the shaft 8 and is held in frictional engagement with the flange 11 by a spring 13. This spring is confined under compression on the shaft by a washer and nut 14 threaded on the shaft. Thus the arm 12 has a friction slip connection with the shaft 8 so that the latter may be oscillated about its axis after as well as during the movement of the arm to selected stop positions. Oscillating movement of the arm 12 in one direction is limited by a stop finger 15 which is fastened by a screw 16 to the casing wall 4 and adapted to be adjusted to engage the arm 12 in various selected positions. The stop finger 15 is disposed to engage one side of a laterally projecting extension 17 on the arm 12 and, as shown in Fig. 1, a switch A is mounted adjacent to the opposite side of the arm 12 so that the extension 17 of the arm 12 is operative to close this switch by springing a contact 18 to close with a contact 19 when the arm 12 is oscillated clockwise from the stop finger 15.

By the mechanism described, the heat responsive element 7 is caused to actuate the arm 12 to close the switch A and hold it closed during periods when the temperature of the heating medium is declining and to allow the switch to spring to open position during periods of rising temperatures of the medium causing the arm 12 to be withdrawn toward the stop 15. By employing a spiral heat responsive element 7 of considerable length, rapid oscillating movement of the shaft 8 and arm 12 is obtained as well as quick response to reversals of the trend of temperature changes in the heating medium. Any desired interval between the reversal of this temperature trend and the movement of the switch A to closed position may be obtained by suitable adjustment in the spacing of the stop finger 15 from the switch contact 18.

In Fig. 1 a room thermostat of common type is indicated generally by the numeral 20. This is of the type wherein the heat responsive movable element is arranged to actuate two switches indicated generally at B and C. The switch B has spring contacts 21 and 22 and the switch C, spring contacts 23 and 24. Contact 21 projects from its support so that it closes with contact 22 prior to the closing of contact 23 with contact 24 in response to declining temperatures in the room where the temperature is to be controlled. The thermostat may be designed to cause the switch C to close after a decline in room temperature of approximately one degree below the temperature which causes the switch B to close. The contacts 22 and 24 have a common terminal 25.

Electric power for operating my control may be supplied through a transformer 26 at a suitable voltage and the control is operative through a relay having a coil 27 and armatures 28 and 29. The armature 28 may be spring biased to open a circuit including wires 30, 31 and 32 of a burner control of any suitable or common type. When the armature 28 closes the circuit including the conductors 30, 31 and 32 the burner is operated to supply heat to the fluid medium in the plenum or other chamber containing the element 7. For oil burners the control circuit usually includes a stack relay and for gas burners there is usually a gas valve control relay. These and the burner operating circuit may be arranged to be energized upon the closing of the armature 28. Details of such common circuits are not shown because they form no part of the present invention.

The armature 29 is provided with spring contacts adapted to simultaneously close a holding circuit through contacts 33, 34 and 35 when the relay coil 27 is energized. This holding circuit may include a timer motor 36 and a switch D which is normally closed and adapted to be opened periodically and momentarily through connections with a cam 37 which is connected to the motor 36 to turn continuously when the motor is operating. The cam 37 is operatively connected to the switch D by a roller 39 carried by a spring arm 40, the latter being connected by a rigid pin 41 of insulating material to a switch member 38. The circuit may be closed either through a contact 42 or through a contact 43 and the circuit is opened momentarily when the member 38 is moved from one of these contacts to the other. The cam 37 is so geared to the shaft of the motor 36 as to cause the switch D to be opened at suitable intervals, e. g., every two or three minutes, when the timer motor is running. This switch is preferably of the quick acting or snap type.

The circuits may include a wire 44 extending from the transformer 26 to a terminal of the relay coil 27, a wire 45 extending from the other relay coil terminal to the common terminal 25 for the switch contacts 22 and 24, a wire 46 extending from the contact 21 of switch B to the contact 19 of switch A and a wire 47 connecting the contact 18 of switch A to the transformer. It will be evident that this main circuit includes the switches A and B and relay coil 27 in series. A branch of this circuit includes a wire 48 extending to the contact 23 of switch C and also includes the coil 27 of the relay. A holding circuit for the relay includes a wire 49 branching from the wire 47 to the armature contact 33, a wire 50 extending from armature contact 34 to contacts 42 and 43 of switch D and a wire 51 extending from the member 38 of switch D to a terminal of the relay coil 27. A branch of this holding circuit includes a wire 52 branching from the wire 44 to a terminal of the motor 36 and a wire 53 extending from the opposite terminal of the motor to the contact 35 of the armature 29.

My temperature control is adapted for use with any ordinary or suitable means for forcibly or otherwise conducting the heating medium from the upper portion of the heater or furnace to the space to be heated. For example, it may be used with a forced air heating system wherein a blower is provided under control of a heat responsive element located in the plenum chamber. Ordinarily such blower is operated intermittently or continuously when the temperature in the plenum chamber exceeds a predetermined minimum. In hot water heating systems, the water may be circulated by gravity or by a pump which is operated under control of a heat responsive element so that the hot water is circulated when its temperature in the boiler exceeds a predetermined minimum. These and other medium circulating systems operate independently of my control and form no part of the present invention.

Operation

In operation, assuming that the room temperature has declined to the point where the thermostat 20 has closed switch B but not switch C and the burner is not in operation, this condition is ordinarily accompanied by declining temperatures in the furnace chamber containing the heating medium and element 7. Under these conditions, the heat responsive element 7 acting through the arm 12 will close switch A, thereby completing the circuit including relay coil 27, causing the armature 28 to close the burner starter circuit and causing the armature 29 to close the holding circuit between the contacts 33, 34 and 35. When there is a high or continuing demand for heat, the thermostat 20 will thereafter close switch C and thereby complete the branch circuit including the relay coil which insures continued operation of the burner until the resulting rise in the room temperatures causes the thermostat to open switch C. In the meantime the medium in the furnace chamber will have been heated with resulting rising temperature therein and the arm 12 will have been retracted, counter-clockwise, causing the switch A to open. This does not however cause the relay to be de-energized if the holding circuit including the switch D remains closed. By operation of the timer motor 36 and cam 37, the switch D is opened momentarily at regular intervals of time and this will break the holding circuit through the relay coil 27 if at the moment of the timer-controlled break the switches A and C are also open.

During periods when the differences between room temperatures and outdoor temperatures is relatively small, the room thermostat will not close the switch C and each time the burner has been started by the closing of the switches A and B the relay holding circuit will be broken after the elapse of a period of time determined by the rate of turning of the cam 37. As shown, this cam is formed to open the holding circuit once every one-half revolution of the cam.

Room thermostats of the class described are ordinarily designed so that there is at least one degree of difference between the minimum and maximum room temperatures which will cause starting and stopping of the burner and it is necessary for the temperature in the room to drop at least one degree from the maximum for any given setting before the burner is started. With my improved control, the burner is started upon the closing of the switch B in response to a drop in room temperature of considerably less than one degree and the override of room temperature above that for which the thermostat is set is also substantially reduced.

Specifically, the burner is started by my control in response to a small decline in the room temperature sufficient to close one of the thermostatically operated switches at any time when the temperature of the heating medium is declining.

Thus the burner is started in anticipation of the demand and before the demand for heat is sufficient to render ordinary controls operative to start the burner. An unusually constant temperature according to the room thermostat setting is thereby obtained.

Having described my invention, what I claim as new and desire to protect by Letters Patent is:

1. In a control for a heating system having a chamber containing a heating medium, a burner disposed to heat medium supplied to said chamber and a room thermostat responsive to room temperatures, the improvements which comprise, a heat responsive element subject to the temperature of the medium in said chamber, a first switch, means operatively connecting said switch to said heat responsive element whereby said switch is closed during periods of declining temperatures in said chamber and open during periods of rising temperature therein, a second switch operatively connected to said room thermostat, a circuit including said first and second switches, a relay having a coil included in said circuit, means under control of said relay for operating said burner, a holding circuit under control of said relay and means under control of said relay for interrupting said holding circuit momentarily at predetermined intervals of time when said relay is energized.

2. A control in accordance with claim 1 wherein said holding circuit comprises a branch of said first mentioned circuit including the coil of said relay.

3. A control in accordance with claim 1 wherein said means for interrupting said holding circuit at predetermined intervals of time comprises an electric motor included in said holding circuit, a switch included in said holding circuit and means operatively connecting said motor to said last mentioned switch.

4. A control in accordance with claim 1 wherein said holding circuit includes a switch and electro-magnetic means for actuating said switch to open position momentarily at predetermined time intervals.

5. A control in accordance with claim 1 wherein said means operatively connecting said first mentioned switch to said heat responsive element comprises a shaft operatively connected to said heat responsive element and adapted to be turned in opposite directions about its axis in response to rising and declining temperatures in said chamber, an arm projecting laterally from said shaft, friction means operatively connecting said shaft to said arm and means for operatively connecting said arm to said first switch.

6. In a control for a heating system having a chamber containing a heating medium, a burner disposed to heat medium supplied to said chamber and a room thermostat responsive to room temperatures, the improvements which comprise, a heat responsive element subject to the temperatures of the medium in said chamber, a first switch, means operatively connecting said switch to said heat responsive element whereby said switch is closed during periods of declining temperature therein, second and third switches operatively connected to said room thermostat, said second switch being disposed to close prior to the closing of said third switch upon a decline in room temperature, a circuit including said first and second switches, a relay having a coil included in said circuit, means under control of said relay for operating said burner, a branch circuit including said third switch and the coil of said relay, a holding circuit under control of said relay and means under control of said relay for interrupting said holding circuit momentarily at predetermined intervals of time when said relay is energized.

7. A control in accordance with claim 6 wherein said holding circuit comprises a second branch of said first mentioned circuit including the coil of said relay.

8. A control in accordance with claim 1 wherein said means for interrupting said holding circuit at predetermined intervals of time comprises an electric motor included in said holding circuit, a fourth switch included in said holding circuit and means operatively connecting said motor to said fourth switch.

9. A control in accordance with claim 6 wherein said holding circuit includes a fourth switch and electro-magnetic means for actuating said switch to open position momentarily at predetermined time intervals.

10. A control in accordance with claim 6 wherein said second and third switches have a common contact terminal which is included in said first mentioned and branch circuits and said third switch is disposed to be opened prior to the opening of said second switch in response to a rise in the room temperature.

References Cited in the file of this patent

UNITED STATES PATENTS

| | | |
|---|---|---|
| 2,057,308 | Persons | Oct. 13, 1936 |
| 2,152,843 | Fisher | Apr. 4, 1939 |
| 2,162,116 | Peltz | June 13, 1939 |
| 2,164,353 | Sargent | July 4, 1939 |